(12) United States Patent
Bodziony et al.

(10) Patent No.: US 10,713,254 B2
(45) Date of Patent: *Jul. 14, 2020

(54) ATTRIBUTE VALUE INFORMATION FOR A DATA EXTENT

(71) Applicant: INTERNATIONAL BUSINESS MACHINES CORPORATION, Armonk, NY (US)

(72) Inventors: Michal Bodziony, Tegoborze (PL); Lukasz Gaza, Jankowice (PL); Artur M. Gruszecki, Cracow (PL); Tomasz Kazalski, Balice (PL); Konrad K. Skibski, Zielonki (PL)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 331 days.

This patent is subject to a terminal disclaimer.

(21) Appl. No.: 15/697,614

(22) Filed: Sep. 7, 2017

(65) Prior Publication Data

US 2018/0039660 A1 Feb. 8, 2018

Related U.S. Application Data

(63) Continuation of application No. 15/230,508, filed on Aug. 8, 2016, now Pat. No. 10,311,057.

(51) Int. Cl.
*G06F 17/30* (2006.01)
*G06F 16/2455* (2019.01)
*G06F 16/25* (2019.01)

(52) U.S. Cl.
CPC ........ *G06F 16/2455* (2019.01); *G06F 16/254* (2019.01)

(58) Field of Classification Search
None
See application file for complete search history.

(56) References Cited

U.S. PATENT DOCUMENTS 6,973,452 B2  12/2005  Metzger et al.
7,010,522 B1  3/2006  Jagadish et al.
(Continued)

FOREIGN PATENT DOCUMENTS

CN  105893453 A  8/2016

OTHER PUBLICATIONS

Bodziony et al., "Attribute Value Information for a Data Extent"; U.S. Appl. No. 15/230,508, filed Aug. 8, 2016.
(Continued)

*Primary Examiner* — Hung D Le
(74) *Attorney, Agent, or Firm* — Cantor Colburn LLP; Robert Bunker

(57) ABSTRACT

The invention relates to a method, computer program product and computer system for providing attribute value information for a data extent having a set of data entries. The method includes: determining a reference string value of a data-extent-specific reference point based on symbol frequencies at each sequence position of attribute string values in a subset of the set of data entries; calculating a distance between each of the attribute string values in the subset and the reference string value of the data-extent-specific reference point resulting in a set of distances; determining for each of the attribute string values an attribute-string-value-specific minimum distance for any reference string value of the data-extent-specific reference point resulting in a set of attribute-string-value-specific minimum distances for the set of data entries; storing for the data extent the minimum (Continued)

distance and the maximum distance of the set of attribute-string-value-specific minimum distances as attribute value information.

18 Claims, 8 Drawing Sheets

(56) References Cited

U.S. PATENT DOCUMENTS

| | | | |
|---|---|---|---|
| 7,318,053 B1 | 1/2008 | Cha et al. | |
| 7,366,716 B2 | 4/2008 | Agrawal et al. | |
| 7,451,151 B2 | 11/2008 | Horvitz et al. | |
| 7,996,369 B2 | 8/2011 | Li et al. | |
| 8,090,745 B2 | 1/2012 | Hayashi et al. | |
| 8,224,830 B2 | 7/2012 | Bidlack | |
| 8,229,734 B2 | 7/2012 | Bennett | |
| 9,141,648 B1 | 9/2015 | Birnbaum et al. | |
| 9,176,995 B2* | 11/2015 | Li | G06F 16/2282 |
| 9,177,227 B2* | 11/2015 | Chehaiber | G06K 9/4671 |
| 9,489,398 B2 | 11/2016 | Weyerhaeuser et al. | |
| 9,953,065 B2 | 4/2018 | Gaza et al. | |
| 2002/0143743 A1 | 10/2002 | Iyer et al. | |
| 2004/0117359 A1 | 6/2004 | Snodgrass et al. | |
| 2004/0117539 A1* | 6/2004 | Bennett | G06F 9/45558 711/6 |
| 2007/0061544 A1 | 3/2007 | Uppala | |
| 2007/0067327 A1 | 3/2007 | Cruanes et al. | |
| 2008/0059412 A1 | 3/2008 | Tarin | |
| 2009/0265340 A1 | 10/2009 | Barcklay et al. | |
| 2010/0005081 A1 | 1/2010 | Bennett | |
| 2010/0106713 A1 | 4/2010 | Esuli et al. | |
| 2010/0125594 A1 | 5/2010 | Li et al. | |
| 2011/0082855 A1* | 4/2011 | Al-Omari | G06F 16/2246 707/715 |
| 2011/0145223 A1 | 6/2011 | Cormode et al. | |
| 2011/0202527 A1 | 8/2011 | McCloskey et al. | |
| 2011/0313979 A1 | 12/2011 | Roberts | |
| 2012/0041974 A1 | 2/2012 | Base et al. | |
| 2013/0212090 A1 | 8/2013 | Sperling et al. | |
| 2013/0262489 A1 | 10/2013 | Shirakawa | |
| 2013/0346392 A1 | 12/2013 | Weyerhauser et al. | |
| 2014/0095520 A1 | 4/2014 | Ziauddin et al. | |
| 2014/0129566 A1 | 5/2014 | Chang et al. | |
| 2015/0035833 A1 | 2/2015 | Hao et al. | |
| 2015/0220617 A1 | 8/2015 | Luo et al. | |
| 2015/0242452 A1* | 8/2015 | Dickie | G06F 16/2282 707/700 |
| 2015/0286682 A1* | 10/2015 | Ziauddin | G06F 16/24554 707/718 |
| 2015/0347492 A1* | 12/2015 | Dickie | G06F 16/2365 707/700 |
| 2015/0363404 A1* | 12/2015 | Dickie | G06F 16/24578 707/741 |
| 2015/0370857 A1 | 12/2015 | Nica et al. | |
| 2015/0379166 A1 | 12/2015 | Xin et al. | |
| 2016/0004740 A1 | 1/2016 | Bendel et al. | |
| 2016/0098451 A1 | 4/2016 | Dickie | |
| 2016/0155278 A1 | 6/2016 | Nozawa et al. | |
| 2016/0199248 A1 | 7/2016 | Jackson et al. | |
| 2016/0239538 A1* | 8/2016 | Gaza | G06F 16/2462 |
| 2016/0350396 A1* | 12/2016 | Blanc | G06F 16/27 |
| 2016/0359886 A1 | 12/2016 | Yadav et al. | |
| 2017/0031931 A1 | 2/2017 | Linda et al. | |
| 2017/0068688 A1 | 3/2017 | Brodt et al. | |
| 2017/0124147 A1* | 5/2017 | Bodziony | G06F 16/90344 |
| 2017/0180497 A1 | 6/2017 | Comstock et al. | |

OTHER PUBLICATIONS

Bodziony, et al., "Providing Multidimensional Attribute Value Information"; U.S. Appl. No. 15/230,509, filed Aug. 8, 2016.
List of IBM Patents or Patent Applications Treated as Related; (Appendix P), Date Filed Sep. 6, 2017; 2 pages.
Anonymous "Method of Limiting I/O Operations for Spatial Data in Data Warehouses," IP.com Prior Art Database Technical Disclosure, Jan. 24, 2017, IP.com No. IPCOM000248962D; 6 pgs.
Johnson, Nick "Algorithm of the Week: Damn Cool Levenshtein Automata", Web Dev Zone Jun. 25, 2013; https://dzone.com/articles/algorithm-week-damn-cool-1; retrieved from Internet on Apr. 11, 2019; 15 pgs.
Rane, Shantanu et al. "Privacy preserving string comparisons based on Levenshtein distance", Published in: 2010 IEEE International Workshop on Information Forensics and Security; IEEE Xplore Dec. 12-15, 2010; https://ieeexplore.ieee.org/document/5711449; 1 pg.
Wikipedia "Approximate string matching", https://en.wikipedia.org/wiki/Approximate_string_matching; retrieved from Internet Apr. 11, 2019; 5 pgs.
Wikipedia "Hamming distance", https://en.wikipedia.org/wiki/Hamming_distance; retrieved from Internet on Apr. 11, 2019; 5 pgs.
Bodziony, et al., "Providing Multidimensional Attribute Value Information"; U.S. Appl. No. 15/792,818, filed Oct. 25, 2017.
List of IBM Patents or Patent Applictions Treated as Related; (Appendix P), Date Filed Oct. 25, 2017; 2 pages.
List of IBM Patents or Patent Applictions Treated as Related; (Appendix P), Date Filed Nov. 7, 2018; 2 pages.
Wikipedia "Levenshtein distance" https://en.wikipedia.org/wiki/Levenshtein_distance; retrieved from Internet on Apr. 11, 2019; 8 pgs.

* cited by examiner

Distance between the strings:

I N V E N T I O N
E X E C U T I O N

Hamming distance:

| I | N | V | E | N | T | I | O | N |
|---|---|---|---|---|---|---|---|---|
| ≠ | ≠ | ≠ | ≠ | ≠ | = | = | = | = |
| E | X | E | C | U | T | I | O | N |
| 1 | 1 | 1 | 1 | 1 | 0 | 0 | 0 | 0 |

→ 5 substitutions

Fig. 2

| | $D_{R1V1}$ | $D_{R1V2}$ | $D_{min}$ | Range |
|---|---|---|---|---|
| CHECKLIST | 7 | | 7 | Min: 0 |
| COMMUNITY | 8 | 0 | 0 | |
| EDUCATION | 8 | 8 | 8 | |
| REFERENCE | 8 | 9 | 8 | Max: 8 |
| | $D_{R2V1}$ | $D_{R2V2}$ | $D_{min}$ | Range |
| MARKETING | 9 | 0 | 0 | Min: 0 |
| MECHANISM | 8 | | 8 | |
| TELEPHONE | 9 | 8 | 8 | |
| VOLUNTEER | 9 | 8 | 8 | Max: 8 |

Reference points:

Data extent 1: {RV1 = C C C C C C C C C, RV2 = C O M M U N I T Y}
Data extent 2: {RV1 = C C C C C C C C C, RV2 = M A R K E T I N G}

Fig. 3

ATTRIBUTE VALUE INFORMATION FOR A DATA EXTENT

DOMESTIC PRIORITY

This application is a continuation of the legally related U.S. application Ser. No. 15/230,508 filed Aug. 8, 2016, which is fully incorporated herein by reference.

BACKGROUND

The present disclosure relates to the field of digital computer systems and, more specifically, to a method for providing attribute value information for a data extent comprising a set of data entries.

One of the challenges of modern data warehouses is the amount of data which has to be processed per each query. Analytical database systems manage very large amounts of data and are optimized for queries that may read large portions of it. In order to limit the resource consumption and amount of I/O operations for example on disks, usually being the bottleneck of the whole system, not all data is read from disk, but only a preselected portion of data. If a query is searches for data which has nothing in common with a data extent on the disk, the respective data extent is not read from the disk at all. Hence, there is a continuous need to improve data selection performance in analytical database systems.

SUMMARY

Various embodiments provide a method for providing attribute value information for a data extent, a computer system and a computer program product as described by the subject matter of the independent claims. Advantageous embodiments are described in the dependent claims. Embodiments of the present invention can be freely combined with each other if they are not mutually exclusive.

In one aspect, the invention relates to a computer-implemented method for providing attribute value information for a data extent comprising a set of data entries. Each data entry comprises an attribute string value of at least a first attribute. Each attribute string value comprises a sequence of symbols. For the first attribute at least one reference string value of a data-extent-specific reference point is determined based on symbol frequencies at each sequence position of the attribute string values of the first attribute in a subset of the set of data entries. The resulting reference string value comprises a sequence of symbols. For each of the attribute string values of the first attribute in the set of data entries an attribute-string-value-specific minimum distance for any reference string value of the data-extent-specific reference point is determined resulting in a set of attribute-string-value-specific minimum distances for the set of data entries. The minimum distance and the maximum distance of the set of attribute-string-value-specific minimum distances are stored for the data extent the as attribute value information for further use with query processing.

In a further aspect, the invention relates to a computer program product. The computer program product comprises a computer-readable storage medium having computer-readable program code embodied therewith. The computer-readable program code is configured to implement the method according to embodiments disclosed herein.

In yet a further aspect, the invention relates to a computer system for providing attribute value information for a data extent comprising a set of data entries. Each data entry comprises an attribute string value of at least a first attribute. Each attribute string value comprises a sequence of symbols. The computer system is configured for performing the following: For the first attribute at least one reference string value of a data-extent-specific reference point is determined based on symbol frequencies at each sequence position of the attribute string values of the first attribute in a subset of the set of data entries. The resulting reference string value comprises a sequence of symbols. For each of the attribute string values of the first attribute in the set of data entries an attribute-string-value-specific minimum distance for any reference string value of the data-extent-specific reference point is determined resulting in a set of attribute-string-value-specific minimum distances for the set of data entries. The minimum distance and the maximum distance of the set of attribute-string-value-specific minimum distances are stored for the data extent the as attribute value information for further use with query processing.

BRIEF DESCRIPTION OF THE DRAWINGS

In the following, embodiments of the invention are explained in greater detail, by way of example only, making reference to the drawings in which:

FIG. 2 depicts schematic diagrams illustrating an exemplary definition of distances between strings in form of the Hamming distance, FIG. 3 depicts a schematic block diagram of data extents and corresponding attribute value information.

DETAILED DESCRIPTION

Figure 1:
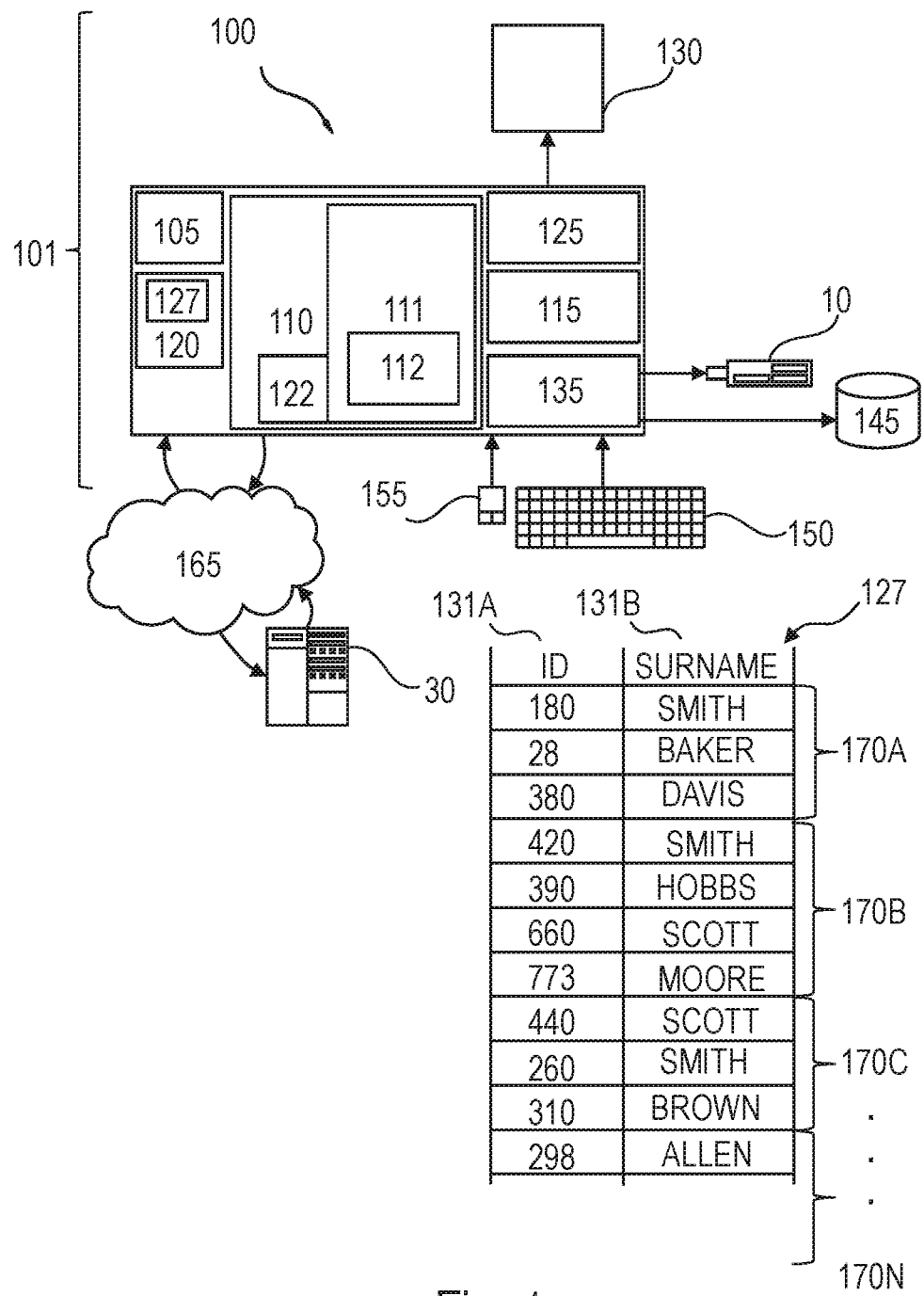
FIG. 1 depicts an exemplary computerized system, suited for implementing a method according to one or more embodiments of the present disclosure.

The descriptions of the various embodiments of the present invention are being presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention relates to the technical field of databases and may be applied to any database implementation including parallel processing implementation, like e.g. Apache Hadoop, massively parallel processing (MPP) architectures, etc.

A main challenge of databases queries is caused by the large amounts of data which need to be read. Embodiments of the method according to the present disclosure may allow efficiently filtering out non-relevant data extents in advance before reading their content, thus significantly decreasing search times.

Embodiments may have the beneficial effect that they allow for limiting the search in advance by taking into account only those data extents which may comprise at least one attribute string value having a distance to a reference point equal to the distance between a search term of the query and the reference point. In other words, only those data extents having a range which at least potentially may comprise the search term are taken into account.

Reference points may provide a kind of reference system with coordinates in form of the respective reference points. For all these coordinates maximum and minimum distances may be determined once for each data extent. The resulting attribute value information may be re-used for all the searches performed afterwards. For each search the distances between the search term and the reference point is determined. The distance between the search term and the reference point as well as the determined maximum and minimum distances provided by the attribute value information are used in order to check for each data extent, whether it could comprise the search term. Otherwise, the data extent apparently does not comprise any potential matches and may be neglected for the query. Thereby unnecessary computation time may be avoided.

Using the pre-determined maximum and minimum distances of each data extent in order to perform a pre-selection, computational cost may significantly be reduced. The present method may be a key performance enabler for analytical database systems, as it may massively save disk I/O and CPU resources.

Using the attribute value information, a preselection of extents may be performed before reading the preselected extents. The attribute value information may comprise information or metadata on the attribute that allows such a preselection. In one example, the attribute value information may comprise a minimum distance between any attribute string value comprised by a data extent and at least one reference string value of at least one reference point as well as a maximum distance between any attribute string value comprised by a data extent and at least one reference string value of the at least one reference point.

For example, the maximum and the minimum distance may define a data-extent-specific range of attribute string values of the first attribute comprised by a respective extent.

The term "extent" as used herein may refer to a logical or physical storage unit (e.g. contiguous area of storage) for storing the data of a data table. The extent may be one of the storage units that is handled by a database management system or an operating system of a computer system. The data extent may for example be the smallest or second smallest storage unit in a hierarchy of storage units used by the database e.g. involving segments and pages.

Using attribute value information associated with each data extent a query may be processed by first determining a read list of data extents that may satisfy the query. For that the attribute value information may be used. For example, if a query condition is 'SURNAME=SMITH', all data extents may be excluded from or skipped by the query with attribute value information indicating that for all attribute string values of the attribute 'SURNAME' comprised by the respective data extent the data-extent-specific range of distances does not comprise the distance between the attribute string value 'SMITH' and a respective reference point.

Thus, a method for determining reference string values for a data-extent-specific reference points based on symbol frequency on each sequence position of attribute values of the data extent may be provided.

Embodiments may have the beneficial effect that data security is preserved, since the created attribute value information do not provide any information about the assigned data themselves without knowledge of the reference points. The method may be adaptable, i.e. there is no risk that new attribute string values drift from reference points, since the reference points are data-extent-specific and maintained at data extent level.

Search performance may be improvement, since the system is prevented from reading data extents which are not important for query processing, i.e. which only comprise entries to far away from the set of reference pints. The method allows determining unimportant data extents without unpacking and reading those data extents.

A data extent may for example be provided in form of a continuous block of data written into a database containing multiple rows in case of row database or multiple values for single column in case of columnar database.

Reference points may be defined and used for limiting the number of read operation during a query processing. Each reference point may comprise a plurality of reference string values. A method is provided for choosing of reference string values based on symbol frequency with respect of each sequence position of the reference string value to be determined.

Considering for example a data extent comprising the following data entries: [ABCD, BBCG, AAAA, ADDD, BBAA]. In this example each data entry comprises one attribute string value. Using a reference point comprising two reference string values [ABCA, ABAD], the following Hamming distances may be calculated for each of the data entries regarding each of the reference string values:

|      | ABCA | ABAD |
|------|------|------|
| ABCD | 1    | 1    |
| BBCG | 2    | 3    |
| AAAA | 2    | 2    |
| ADDD | 3    | 2    |
| BBDA | 2    | 2    |

In order to assign attribute value information to the data extent, a set of attribute-string-value-specific minimum distances comprising the minimum distance of each attribute string value to any one of reference string values of the respective point may be determined:

|      | Min distance |
|------|--------------|
| ABCD | 1            |
| BBCG | 2            |
| AAAA | 2            |
| ADDD | 2            |
| BBDA | 2            |

The resulting attribute value information describing the minimum and maximum distance between the attribute string values of the data entries of the data extent and the reference point is provided by the minimum and maximum distances assigned to each data extent defining the limits of a data range of validity for the respective data extent with respect to the reference point. In the aforementioned example, the minimum distance of the set of attribute-string-value-specific minimum distances is 1 for ABCD and maximum distance is 2 for BBDA.

According to embodiments, the determining of the reference string value comprises determining for each sequence position of the respective attribute string values a most frequently used symbol which is selected to be the symbol of the reference string value at the respective sequence position. These embodiments may have the beneficial effect that the data range identified by the attribute value information may be reduced and thus the selectivity of the attribute value information increased.

According to embodiments, the subset is equal to the set of data entries and the set of attribute-string-value-specific minimum distances for the set of data entries being equal to the set of distances.

According to embodiments, the method further comprises using an initial reference string value of the data-extent-specific reference point for the determining of the reference string value. The initial reference string value comprising a sequence of symbols. For determining the reference string value, the method further comprises: A distance between each of the attribute string values of the first attribute in the set of data entries and the initial reference string value of the data-extent-specific reference point is calculated resulting in the set of attribute-string-value-specific minimum distances for the set of data entries. The largest distance comprised by the set of attribute-string-value-specific minimum distances is determined. For the subset all attribute string values with an attribute-string-value-specific minimum distances equal to the determined largest distance are selected. The reference string value is determined using the attribute string values of the subset by determining for each sequence position of the attribute string values of the subset a most frequently used symbol which is selected to be the symbol of the reference string value at the respective sequence position. These embodiments may have the beneficial effect that starting with an arbitrary initial reference string value, a data-extent-specific reference string value allowing for a high selectivity of the attribute value information may efficiently be determined.

According to embodiments, the initial reference string value comprises a sequence of symbols selected based on symbol frequencies at each sequence position of the attribute string values of the first attribute in the set of data entries. According to embodiments, the initial reference string value comprises a sequence of identical symbols. According to embodiments, the initial reference string value comprises a sequence of randomly selected symbols. According to embodiments, the symbols of the initial reference string value are randomly selected from a predefined set of symbols comprising most frequently used symbols of a set of symbols selected for the attribute string values. A set of symbols may for example be an alphabet of a particular language. Besides alphabetic characters, the set of symbols may further comprise numeric characters. For example, it may comprise Latin letters and Arabic digits. It may also comprise special characters like punctuation marks.

According to embodiments, the method further comprises repeatedly determining in a sequential order additional reference string values of the data-extent-specific reference point based on symbol frequencies at each sequence position of the attribute string values for the first attribute until a predefined termination criterion is satisfied. The determining of each of the additional reference string values comprises: A distance between each of the attribute string values in the subset used for determining the latest reference string value according to the sequential order and the respective latest reference string value is calculated. It is checked for each attribute string value in the subset whether the respective calculated distance is smaller than the attribute-string-value-specific minimum distance for the respective attribute string value in the set of attribute-string-value-specific minimum distances. In case the calculated distance is smaller, the respective attribute-string-value-specific minimum distance of the set of attribute-string-value-specific minimum distances is updated with the calculated distance. An updated largest distance comprised by the updated set of attribute-string-value-specific minimum distances is determined. For an additional subset all attribute string values with an attribute-string-value-specific minimum distance equal to the determined updated largest distance are selected. The additional reference string value is determined using the attribute string values of the additional subset by determining for each sequence position of the attribute string values of the additional subset a most frequently used symbol which is selected to be the symbol of the respective additional reference string value at the respective sequence position.

These embodiments may have the beneficial effect that with a plurality of additional reference string value, the range of data indicated by the attribute value information may efficiently be reduced such that a high selectivity for queries may be reached.

An embodiment of the method of generating a data-extent-specific reference point comprising a plurality of reference string values may be illustrated by way of the following pseudo code:

L—attribute string value length
E[ ]—set of data entries
D[ ]—set of attribute-string-value-specific minimum distances
T—desired maximum distance for the set of attribute-string-value-specific minimum distances
R[ ]—set of reference string values comprised by data-extent-specific reference point
Rmax—maximum number of reference string values comprised by data-extent-specific reference point
While (at least one distance in D>T−1 and size (R)<Rmax):
r=new reference string value
S=elements of E with a largest distance in D
For (i from 0 to L−1)
r[i]=most frequent character in elements of S at position i
add r to R
calculate distances DS of elements of S to R
if DS smaller than element of D assigned to element of S
update S with DS.

The procedure stops, when each distance in D<T or the threshold size (R)=Rmax is reached.

In the following an exemplary calculation of new reference string values for illustrative purposes will described. A data extent may comprise the following entries:

E=[ABCDM, BBCGC, AAAAV, ADDDM, BBAAA, DFGHN, AWIOC, DWGHV].

The maximum number of reference string values Rmax of the data-extent-specific reference point to be determined may be Rmax=3. The desired maximum distance T for the set of attribute-string-value-specific minimum distances may be T=2.

At step 1, an arbitrary initial reference string value for the reference point RP may be chosen, e.g. R=[ABCAX]. The minimum distance, e.g. Hamming distance, for each of the entries of the data extent E to this reference point, i.e. initial reference string values, are calculated:
distance (R, ABCDM)=2,
distance (R, BBCGC)=3,
distance (R, AAAAV)=3, distance (R, ADDDM)=4,
distance (R, BBAAA)=3,
distance (R, DFGHN)=5,
distance (R, AWIOC)=4,
distance (R, DWGHV)=5.

The maximum distance of the set of attribute-string-value-specific minimum distances D is 5 for the attribute string values DFGHN and DWGHV. This maximum distance is larger than the desired maximum distance T, therefore the procedure continues. The number of reference string values is 1.

Next for each position of the most distance attribute string values DFGHN and DWGHV, the most frequent symbols are determined: The most frequent symbol at sequence position [0] is D, which occurs twice.

The most frequent symbol at sequence position [1] is W, which occurs once.

The most frequent symbol at sequence position [2] is G, which occurs twice.

The most frequent symbol at sequence position [3] is H, which occurs twice.

The most frequent symbol at sequence position [4] is V, which occurs once.

These symbols are used to generate an additional reference string value for the data-extent-specific reference point. In this example, in case there are more than one most frequent symbols which occur with the same frequency, the last one of the respective symbols according to the order of the data entries is selected. Alternatively, the first one of the respective symbols may be selected or a random one using a random selection algorithm. Thus, the next additional reference string value for the reference point determined based on the aforementioned selection criteria is reference string value.

At step 2, the data-extent-specific reference point comprises a set of two reference string values R=[ABCAX, DWGHV]. The Hamming distance for each of the most distance attribute string values DFGHN and DWGHV to the new reference string value DWGHV is calculated. In case the distance for DWGHV is smaller than the smallest distance for the respective attribute string values so far, the set of attribute-string-value-specific minimum distances D is updated:
distance (R, ABCDM)=2,
distance (R, BBCGC)=3,
distance (R, AAAAV)=3,
distance (R, ADDDM)=4,
distance (R, BBAAA)=3,
distance (R, DFGHN)=2,
distance (R, AWIOC)=4,
distance (R, DWGHV)=0.

The maximum distance of the set of attribute-string-value-specific minimum distances D is 4 for the attribute string values ADDDM and AWIOC. This maximum distance is larger than the desired maximum distance T, therefore the procedure continues. The number of reference string values is 2.

Next for each position of the most distance entries, the most frequent symbol is determined:
The most frequent symbol at sequence position [0] is A, which occurs twice.
The most frequent symbol at sequence position [1] is D, which occurs once.
The most frequent symbol at sequence position [2] is D, which occurs once.
The most frequent symbol at sequence position [3] is D, which occurs once.

The most frequent symbol at sequence position [4] is C, which occurs once.

These symbols are used to generate an additional reference string value for the reference point. The next additional value for the reference points determined based on the aforementioned selection criteria is ADDDC.

At step 3, the data-extent-specific reference point comprises a set of two reference string values R=[ABCAX, DWGHV, ADDDC]. The Hamming distance for each of the most distance attribute string values ADDDM and AWIOC to the new reference string value ADDDC is calculated. In case the distance for ADDDC is smaller than the smallest distance for the respective attribute string values so far, the set of attribute-string-value-specific minimum distances D is updated:
distance (R, ABCDM)=2,
distance (R, BBCGC)=3,
distance (R, AAAAV)=3,
distance (R, ADDDM)=3,
distance (R, BBAAA)=3,
distance (R, DFGHN)=3,
distance (R, AWIOC)=3,
distance (R, DWGHV)=0.

The maximum distance of the set of attribute-string-value-specific minimum distances is 3 for the entries BBCGC, AAAAV, ADDDM, BBAAA, DFGHN, and AWIOC. The number of reference points is 3. Thus, Rmax=3 has been reached, and the procedure terminates. In case of T=3 and Rmax=3, the procedure would terminate due to both thresholds being reached. In case of T=3 and Rmax=4, the procedure would terminate due to threshold T=3 being reached.

According to embodiments, the criterion being that all attribute-string-value-specific minimum distances comprised by the updated set of attribute-string-value-specific minimum distances are equal to or smaller than a predefined threshold distance. According to embodiments, the criterion being that a maximum total number of reference string values of the data-extent-specific reference point is reached. These embodiments may have the beneficial effect that the procedure is terminated as soon as an efficient set of reference string values has been determined which allows for a search performance.

According to embodiments, in case that at a sequence position there is more than one most frequently used symbol of the selected attribute string values the symbol is selected from the most frequently used symbols which according to the order of the selected attribute string values first occurs at the respective sequence position. According to embodiments, in case that at a sequence position there is more than one most frequently used symbol of the selected attribute string values the symbol is selected from the most frequently used symbols which according to the order of the selected attribute string values last occurs at the respective sequence position. According to embodiments, in case that at a sequence position there are more than one most frequently used symbols of the selected attribute string values a symbol is randomly selected from the most frequently used symbols. According to embodiments, in case that at a sequence position there are more than one most frequently used symbols of the selected attribute string values a symbol is selected from the most frequently used symbols which in a set of symbols selected for the attribute string values is most frequently used.

According to embodiments, the number of symbols of the reference string value of the data-extent-specific reference point is equal to the maximum number of symbols per attribute string value of the respective data extent.

According to embodiments, for calculating distances between the attribute string values and the reference string value of the data-extent-specific reference point the method further comprises: In the attribute string values infrequently used symbols of a set of symbols from which the symbols of the attribute string values are selected by more frequently used symbols of the set of symbols. Thus the size of the set of symbols relevant for the analysis may be reduced by skipping infrequent symbols. In some dictionaries some symbols may be rare, such that the probability of those symbols to be used in a randomly chosen string is quite low. For example, symbols 'q', 'x', 'v' are almost not used in polish dictionary. By replacing those rare symbols with a replacement character, the size of set of symbols may be reduced and the efficiency of the attribute value information, e.g. based on Hamming distance, be improved. Thereby, effective reference points may be established even for attribute string values generated from large sets of symbols, e.g. large alphabets, and short reference string values, due to the removing of infrequent symbols and the usage of multiple reference string values per reference point.

According to embodiments, the number of symbols of each attribute string values of the first attribute in the set of data entries is equal. These embodiments may have the beneficial effect that they allow for a simple handling of the attribute string values.

According to embodiments, for calculating distances between the attribute string values and the reference string value of the data-extent-specific reference point the method further comprises: In case the number of symbols of one of the attribute string values is smaller than a predefined number of symbols adding to the respective attribute string value one or more symbols which are no elements of a set of symbols from which the symbols of the attribute string values are selected such that the predefined number of symbols is reached. Using for example the Hamming distance as a measure, it may be assumed that all attribute string values of the data extent as well as the reference string values of the reference points have the same length. In practice this assumption may not always be satisfied. In order to be able to use Hamming distance also for strings of different length, special character may be added at the end of strings as many times as needed in order to achieve a pre-defined maximum length.

According to embodiments, the attribute values comprise alphabetical symbols. According to embodiments, the attribute values comprise numerical symbols. According to embodiments, the attribute values comprise alphanumerical symbols.

The computer-implemented method of claim 1, the data entries are provided in form of character (CHAR) and/or variable character (VARCHAR) fields. This may have the advantage that the present method may be efficiently applied to databases comprising entries of alphanumerical type of data, in particular character or variable character field data.

According to embodiments, the calculated distances are minimum edit distances. According to embodiments, the minimum edit distance is calculated using one of the following metrics: Hamming-Metric, Levenshtein-Metric, Damerau-Levenshtein-Metric.

The term "string" as used herein may refer to a sequence of symbols. The term "distance" as used herein may refer to a measure for a similarity between two strings. Such a similarity between strings can be calculated in a plurality of ways. One simple example is the calculation of a Hamming distance, which represents the number of symbols two strings have in common. Between two strings of equal length it is the number of positions at which the corresponding symbols are different, i.e. it measures the minimum number of substitutions required to change one string into the other. The Hamming distance between the strings 'COAT' and 'COST' is e.g. one, since the first, second and fourth symbols are identical, while only the third symbols are different from each other. Thus, the Hamming distance allows only substitution and hence may only be apply to strings of the same length. According to an alternative definition of the Hamming distance also different length of strings are taken into account by identifying all the symbols constituting the length difference as mismatches: According to this definition the distance e.g. between the strings 'COAT' and 'COATING' is three, since 'COATING' is by three symbols longer than 'COAT'.

According to an example, the distances determined are minimum edit distances. A minimum edit distance is a quantification of dissimilarity of two strings, e.g. words, by counting the minimum number of operations required to transform one string into the other. Different measures of the minimum edit distance are known, which are calculated using different sets of allowable edit operations. Thus, the minimum edit distance reflects the minimum number of editing operations which are necessary to get from a first string to a second string. For example, to get from the string 'STOP' to the string 'STEP' it is only necessary to substitute the letter 'O' by an 'E'. Therefore, the minimum edit distance between those two strings would be one.

Each operation is assigned has an assigned cost value. By counting the overall cost of all operations necessary to get from a first string to a second string the distance between two strings can be determined. This may have the advantage that the minimum edit distance allows for an efficient quantization of similarities of strings.

According to an example, the edit distance is determined according to the Levenshtein-Metric. The Levenshtein-Metric may be used for measuring the difference between two strings, wherein the Levenshtein distance between two strings based on the Levenshtein-Metric is the minimum number of single-character edits, i.e. insertions, deletions or substitutions, required to change one string into the other.

The Levenshtein distance $lev_{a,b}(|a|, |b|)$ between two strings a, b may be defined as follows:

$$lev_{a,b}(i, j) = \begin{cases} \max(i, j) & \text{if } \min(i, j) = 0, \\ \min \begin{cases} lev_{a,b}(i-1, j) + 1 \\ lev_{a,b}(i, j-1) + 1 \\ lev_{a,b}(i-1, j-1) + 1_{(a_i \neq b_j)} \end{cases} & \text{otherwise.} \end{cases}$$

$1_{(a_i \neq b_j)}$ is the equal to 0 when $a_i = b_j$ and equal to 1 otherwise. The first element in the minimum corresponds to deletion (from a to b), the second to insertion and the third to match or mismatch, depending on whether the respective symbols are the same. This may have the advantage that Levenshtein-Metric is easy to calculate and thus the distance statistics for the data extents may for example be calculated when filling the database with entries, thereby not causing too much overhead in determining the corresponding distance values.

According to a further example, the edit distance is determined according to the Damerau-Levenshtein-Metric. The Damerau-Levenshtein distance is a distance, i.e. string metric, between two strings, i.e. finite sequence of symbols like a word, given by counting the minimum number of operations needed to transform one string into the other, where an operation is defined as an insertion, deletion, or substitution of a single character, or a transposition of two adjacent characters. The Damerau-Levenshtein distance differs from the classical Levenshtein distance defined above by including transpositions among its allowable operations.

The Damerau-Levenshtein distance $d_{a,b}(|a|, |b|)$ between two strings a, b may be defined as follows:

$$d_{a,b}(i, j) = \begin{cases} \min \begin{cases} \max(i, j) & \text{if } \min(i, j) = 0, \\ d_{a,b}(i-1, j)+1 \\ d_{a,b}(i, j-1)+1 \\ d_{a,b}(i-1, j-1)+1_{(a_i \neq b_j)} & \text{if } i, j > 1 \text{ and } a_i = b_{j-1} \text{ and } a_{i-1} = b_j, \\ d_{a,b}(i-2, j-2) \end{cases} \\ \min \begin{cases} d_{a,b}(i-1, j)+1 \\ d_{a,b}(i, j-1)+1 & \text{otherwise.} \\ d_{a,b}(i-1, j-1)+1_{(a_i \neq b_j)} \end{cases} \end{cases}$$

$1_{(a_i \neq b_j)}$ is the equal to 0 when $a_i = b_j$ and equal to 1 otherwise. Each recursive call matches one of the cases covered by the Damerau-Levenshtein distance:

$d_{a,b}(i-1, j)+1$ corresponds to a deletion (from a to b), $d_{a,b}(i, j-1)+1$ corresponds to an insertion (from a to b), $d_{a,b}(i-1, j-1)+1_{(a_i \neq b_j)}$ corresponds to a match or mismatch, depending on whether the respective symbols are the same, and $d_{a,b}(i-2, j-2)$ corresponds to a transposition between two successive symbols.

This may have the advantage that Damerau-Levenshtein-Metric is easy to calculate and thus the distance statistics for the data extents may for example be calculated when filling the database with entries, thereby not causing too much overhead in determining the corresponding distance values.

According to embodiments, in case a new attribute string value of the first attribute is added to the data extent, the method further comprises maintaining the data-extent-specific reference point at data extent level. The data-extent-specific reference point is maintained at data extent level by the following: A distance is calculated between the new attribute string value and each reference string value of the data-extent-specific reference point. The minimum distance of the distances calculated for the new attribute string is determined. It is checked whether the minimum distance of the new attribute string value satisfies one of the following two criteria: being larger than the maximum distance or being smaller than the minimum distance of the attribute value information of the data extent. In case the minimum distance of the new attribute string value satisfies one of the two criteria, the reference string values of the data-extent-specific reference point is determined.

These embodiments may have the beneficial effect that amendments of the content of a data extent may efficiently be taken into account and the selectivity of the attribute value information of the data extent may be maintained. A new attribute string value may also be added to the data extent in form of an updating of an existing attribute string value.

According to embodiments, in case a new attribute string value of the first attribute is added to the data extent, the method further comprises maintaining the attribute value information for the data extent. The attribute value information for the data extent is maintained by the following: A distance is calculated between the new attribute string value and each reference string value of the data-extent-specific reference point. The minimum distance of the distances calculated for the new attribute string is determined. It is checked whether the minimum distance of the new attribute string value is larger than the maximum distance of the attribute value information of the data extent. In case the minimum distance of the new attribute string value is larger, the maximum distance is replaced by the respective lager distance. It is further checked whether the minimum distance of the new attribute string value is smaller than the minimum distance of the attribute value information of the data extent. In case the minimum distance of the new attribute string value is smaller the minimum distance is replaced by the respective smaller distance.

These embodiments may have the beneficial effect that amendments of the content of a data extent may efficiently be taken into account and the selectivity of the attribute value information of the data extent may be maintained.

According to embodiments, in case an attribute string value of the first attribute is deleted from the data extent, the data-extent-specific reference point is retained unaltered.

These embodiments may have the beneficial effect that amendments of the content of a data extent may efficiently be taken into account and the selectivity of the attribute value information of the data extent may be maintained.

According to embodiments, in case an attribute string value of the first attribute is deleted from the data extent, the method further comprises maintaining the attribute value information for the data extent. The attribute value information for the data extent is maintained by the following: The distance between each of the remaining attribute string values of the first attribute in the set of data entries and each of the reference string values of the data-extent-specific reference point is calculated. For each of the remaining attribute string values the minimum distance of the calculated distances is determined resulting in a reduced set of attribute-string-value-specific minimum distances. The minimum distance and the maximum distance of the reduced set of attribute-string-value-specific minimum distances are determined. It is checked whether the determined maximum distance is smaller than the maximum distance of the attribute value information of the respective data extent. In case the determined maximum distance is smaller, the maximum distance of the attribute value information is replaced by the determined maximum distance. It is further checked whether the determined minimum distance is larger than the minimum distance of the attribute value information of the respective data extent. In case the determined minimum distance is larger, the minimum distance of the attribute value information is replaced by the determined minimum distance.

These embodiments may have the beneficial effect that amendments of the content of a data extent may efficiently be taken into account and the selectivity of the attribute value information of the data extent may be maintained.

According to embodiments, the method is performed for a plurality of the data extents resulting in a data-extend-specific reference point for each of the respective data extents.

According to embodiments, the method further comprises processing a query. The query comprises a search value. Processing the query comprises: A reference-point-specific search distance between the search value and each dataextend-specific reference point is determined resulting in a set of reference-point-specific search distances. Each reference-point-specific search distance is the minimum distance between the search value and any reference string value of the respective data-extent-specific reference point. A query-specific set of data extents of the plurality of data extents is determined. The query-specific set of data extents comprises all data extents for which the reference-point-specific search distance of a data-extend-specific reference point of the respective data extend lies within the limits provided by the minimum reference-point-specific distance and the maximum reference-point-specific distance of the respective data-extend-specific reference point stored as attribute value information for the respective data extent. It is searching for the search value in the data entries of the data extents of the query-specific set.

FIG. 1 depicts an exemplary computerized system, suited for implementing embodiments of the method as involved in this disclosure. It will be appreciated that the methods described herein are at least partly non-interactive, and automated by way of computerized systems, such as servers or embedded systems. In exemplary embodiments though, the methods described herein can be implemented in a (partly) interactive system. These methods can further be implemented in software 112, 122 (including firmware 122), hardware (processor) 105, or a combination thereof. In exemplary embodiments, the methods described herein are implemented in software, as an executable program, and is executed by a special or general-purpose digital computer, such as a personal computer, workstation, minicomputer, or mainframe computer. The most general system 100 therefore includes a general-purpose computer 101.

In exemplary embodiments, in terms of hardware architecture, as shown in FIG. 1, the computer 101 includes a processor 105, memory (main memory) 110 coupled to a memory controller 115, and one or more input and/or output (I/O) devices (or peripherals) 10, 145 that are communicatively coupled via a local input/output controller 135. The input/output controller 135 can be, but is not limited to, one or more buses or other wired or wireless connections, as is known in the art. The input/output controller 135 may have additional elements, which are omitted for simplicity, such as controllers, buffers (caches), drivers, repeaters, and receivers, to enable communications. Further, the local interface may include address, control, and/or data connections to enable appropriate communications among the aforementioned components. As described herein the I/O devices 10, 145 may generally include any generalized cryptographic card or smart card known in the art.

The processor 105 is a hardware device for executing software, particularly that stored in memory 110. The processor 105 can be any custom made or commercially available processor, a central processing unit (CPU), an auxiliary processor among several processors associated with the computer 101, a semiconductor based microprocessor (in the form of a microchip or chip set), a macroprocessor, or generally any device for executing software instructions.

The memory 110 can include any one or combination of volatile memory elements (e.g., random access memory (RAM, such as DRAM, SRAM, SDRAM, etc.)) and non-volatile memory elements (e.g., ROM, erasable programmable read only memory (EPROM), electronically erasable programmable read only memory (EEPROM), programmable read only memory (PROM). Note that the memory 110 can have a distributed architecture, where various components are situated remote from one another, but can be accessed by the processor 105.

The software in memory 110 may include one or more separate programs, each of which comprises an ordered listing of executable instructions for implementing logical functions, notably functions involved in embodiments of this invention. In the example of FIG. 1, software in the memory 110 includes instructions 112 e.g. instructions to manage databases such as a database management system. The memory 110 may further comprise a query optimizer. The query optimizer may comprise instructions e.g. software instructions that when executed may provide a query execution plan for executing a given query.

The software in memory 110 shall also typically include a suitable operating system (OS) 111. The OS 111 essentially controls the execution of other computer programs, such as possibly software 112 for implementing methods as described herein.

The methods described herein may be in the form of a source program 112, executable program 112 (object code), script, or any other entity comprising a set of instructions 112 to be performed. When a source program, then the program needs to be translated via a compiler, assembler, interpreter, or the like, which may or may not be included within the memory 110, so as to operate properly in connection with the OS 111. Furthermore, the methods can be written as an object oriented programming language, which has classes of data and methods, or a procedure programming language, which has routines, subroutines, and/or functions.

In exemplary embodiments, a conventional keyboard 150 and mouse 155 can be coupled to the input/output controller 135. Other output devices such as the I/O devices 145 may include input devices, for example but not limited to a printer, a scanner, microphone, and the like. Finally, the I/O devices 10, 145 may further include devices that communicate both inputs and outputs, for instance but not limited to, a network interface card (NIC) or modulator/demodulator (for accessing other files, devices, systems, or a network), a radio frequency (RF) or other transceiver, a telephonic interface, a bridge, a router, and the like. The I/O devices 10, 145 can be any generalized cryptographic card or smart card known in the art. The system 100 can further include a display controller 125 coupled to a display 130. In exemplary embodiments, the system 100 can further include a network interface for coupling to a network 165. The network 165 can be an IP-based network for communication between the computer 101 and any external server, client and the like via a broadband connection. The network 165 transmits and receives data between the computer 101 and external systems 30, which can be involved to perform part or all of the steps of the methods discussed herein. In exemplary embodiments, network 165 can be a managed IP network administered by a service provider. The network 165 may be implemented in a wireless fashion, e.g., using wireless protocols and technologies, such as WiFi, WiMax, etc. The network 165 can also be a packet-switched network such as a local area network, wide area network, metropolitan area network, Internet network, or other similar type of network environment. The network 165 may be a fixed wireless network, a wireless local area network (LAN), a wireless wide area network (WAN) a personal area network (PAN), a virtual private network (VPN), intranet or other suitable network system and includes equipment for receiving and transmitting signals.

If the computer 101 is a PC, workstation, intelligent device or the like, the software in the memory 110 may further include a basic input output system (BIOS) 122. The BIOS is a set of essential software routines that initialize and test hardware at startup, start the OS 111, and support the transfer of data among the hardware devices. The BIOS is stored in ROM so that the BIOS can be executed when the computer 101 is activated.

When the computer 101 is in operation, the processor 105 is configured to execute software 112 stored within the memory 110, to communicate data to and from the memory 110, and to generally control operations of the computer 101 pursuant to the software. The methods described herein and the OS 111, in whole or in part, but typically the latter, are read by the processor 105, possibly buffered within the processor 105, and then executed.

When the systems and methods described herein are implemented in software 112, as is shown in FIG. 1, the methods can be stored on any computer readable medium, such as storage 120, for use by or in connection with any computer related system or method. The storage 120 may comprise a disk storage such as HDD storage.

The system 100 may have access to at least one data table (or data set) 127. For example, the software 112 may receive (automatically or upon request) as input the data table 127, or may download the data table 127 from a source system that is e.g. connected to the system 100. For simplification purpose data table 127 is shown as part of storage 120 but it can be stored in memory 110 or any other storage to which the system 100 has access.

The data table 127 may comprise one or more columns 131A-B, wherein each column is represented by a respective attribute (e.g. 'ID' 131A and 'SURNAME' 131B). The rows or records of the data table 127 may comprise values of the attributes.

The term "data table" or data set as used herein refers to a collection of data that may be presented in tabular form. Each column in the data table may represent a particular variable or attribute. Each row in the data table may represent a given member, record or entry of the data table.

The data table 127 comprises data of a set of data extents 170A-N. Each data extent 170A-N may be assigned with attribute value information. For example, data extent 170A may comprise three data entries each comprising an attribute string value of the attribute 'SURNAME', i.e. 'SMITH', 'BAKER', and 'DAVIS'. The attribute value information may indicate as a range of the string attribute values comprised by the data extent. The range may for example be limited by the minimum and maximum value of the attribute-string-value specific minimum distances between the attribute string value of the data entries stored in the respective data extent and any reference string value of a data-extent-specific reference point.

While FIG. 1 only shows a few attributes, it will be appreciated that numerous attributes may exist or may be used.

FIG. 2 is an example on how to determine the distance, more precisely the Hamming-distance, between two string values, i.e. 'INVENTION' and 'EXECUTION', using the Hamming metric.

Using the Hamming metric, the number of symbols which differ from each other are counted, i.e. the number of substitutions necessary in order to transform one string into the other. As shown in FIG. 2, the first five symbols of the two strings are not identical, while the last four symbols, 'T', 'I', 'O' and 'N' are identical. Thus, the Hamming distance between the two strings, 'INVENTION' and 'EXECUTION', is five as five. Determining the Hamming distance between two strings may be a fast and simple approach to determine a distance.

The example depicted in FIG. 2 is only directed towards strings comprising symbols in the form of letters. However, if the database comprises for example numbers (integer, float, . . . ) the distance between two numbers may be defined as the numerical difference between two numbers. However, it would also be possible to use the minimum edit distance to get from a string of numbers to another string of numbers.

FIG. 3 is an example of a database 300 comprising eight data entries. The eight data entries comprise one attribute string value each. In the present example the attribute string values are the following arbitrary nine letter nouns: 'CHECKLISTY', 'COMMUNITY', 'EDUCATION', 'REFERENCE', 'MARKETING', 'MECHANISM', 'TELEPHONE', and 'VOLUNTEER'. Those eight data entries are arranged in two exemplary data extents 302 and 304, each data extent comprising four of the data entries. Assigned to those data extents is attribute value information 310. In the following, the determination of this attribute value information 310 will be discussed.

In the example depicted in FIG. 3 to each of the two data extents a data-extent-specific reference point is assigned. Each of the two data-extent-specific reference points comprises two reference string values. The first reference point assigned to the first data extent comprises the two reference string values R1V1=CCCCCCCCC and R1V2=COMMUNITY, while the second reference point assigned to the second data extent comprises the two reference string values R2V1=CCCCCCCCC and R2V2=MARKETING. The first reference string value R1V1 and R2V1 may for example be used as initial reference string values for determining second reference string value R1V2 and R2V2, respectively. The symbols of the first reference string values R1V1 and R2V1 may for example be generated by selecting an arbitrary symbol of a predefined set of symbols, like e.g. an alphabet. The selected symbol may be added to each sequence position of the string values R1V1 and R2V1. According to the example shown in FIG. 3, the first reference string values of all data extent, i.e. the respective initial reference string values, are all equal. According to an alternative example, the first reference string values may be different from each other.

Focusing on the first data extent 302 the determination of the individual distances of the strings comprised in the first data extent 302 to the first reference string value R1V1 'CCCCCCCCC' is described in the following.

The first string value, 'CHECKLIST', has two letters in common with the first reference string value R1V1 of the first reference point. In case the distance is defined as the minimum edit distance in form of the Hamming distance between two strings, wherein each editing operation has a cost value of three, the distance between the string value 'CHECKLIST' and a sequence of nine C's is seven. As the subsequent string value, 'COMMUNITY', has one letter in common with the first reference string value of R1V1, the corresponding distance is eight. The third string value of the first data extent 302 is 'EDUCATION' also having a distance of eight, i.e. one letter in common. The same holds true for the last string value of data extent 302, i.e. 'VOLUNTEER'. Considering the set of distances 320 calculated for the initial reference string value R1V1, this set is a set of attribute-string-value-specific minimum distances, since there is only one distance per attribute-string-value.

The largest distance set of distances 320 is eight for the attribute string values 'COMMUNITY', 'EDUCATION', and 'REFERENCE'. These three attribute string values may form a subset and be used for determining the second reference string value R1V2. In order to determine the second reference string value R1V2 for each sequence position of the attribute string values of the subset a most frequently used symbol may be determined and selected to be the symbol of the reference string value at the respective sequence position. In case that there is more than one most frequently used symbol at a sequence position, for example the symbol is selected from the most frequently used symbols which according to the order of the selected attribute string values first occurs at the respective sequence position. In the present example, at sequence position one there are three symbols which each occur once, i.e. 'C', 'E', and 'R'. The first attribute string value according to the order of the selected attribute string values comprising one of the most frequently used symbols is 'COMMUNITY'. Thus, the 'C' occurs first at the first sequence position and is selected to be assigned to the first sequence position of the second reference string value R1V2. The resulting second reference string value R1V2 is 'COMMUNITY'. The distance 322 calculated for the subset of attribute string values may be used to update the set of attribute-string-value-specific minimum distances 320 resulting in the updated set of attribute-string-value-specific minimum distances 324. A string-value-specific minimum distance of the attribute-string-value-specific minimum distances 320 is updated in case the distance calculated for the subset is smaller than the string-value-specific minimum distance of the attribute-string-value-specific minimum distances 320. According to the example shown in FIG. 3 this is the case for the attribute string value 'COMMUNITY', but not for the attribute values 'EDUCATION' and 'REFERENCE' for which the string-value-specific minimum distances are not updated.

As a result, for the first data extent 302 the minimum distance and the maximum distance of the updated set of attribute-string-value-specific minimum distances 324 are zero and eight, respectively. These minimum and maximum distances are stored in the attribute value information 310.

The determination of the attribute value information for the second data extent 304 is conducted analogously. The attribute string values with the largest to the initial reference string value R2V1 'CCCCCCCC' are 'MARKETING', 'TELEPHONE', and 'VOLUNTEER'. Using these three attribute string values the second reference string value R2V2 is determined based on symbol frequencies at each sequence position of these three attribute string values. The resulting second reference string value R2V2 is 'MARKETING'. Since the distance between each of these three attribute string values and the second reference string value R2V2 is smaller than the distance between each of these three attribute string values and the initial reference string value R2V1, the distances to the second reference string value R2V2 are used for updating attribute-string-value-specific minimum distances. The minimum distance and the maximum distance of the updated set of attribute-string-value-specific minimum distances are zero and eight, respectively. These minimum and maximum distances are stored in the attribute value information for the second data extent 304.

As the determination of the data-extent-specific reference points and of the attribute value information described above does not require a significant computational effort, the determination of the distance statistics may for example be executed once a database is loaded with the respective data entries of the data extents.

Figure 4A:
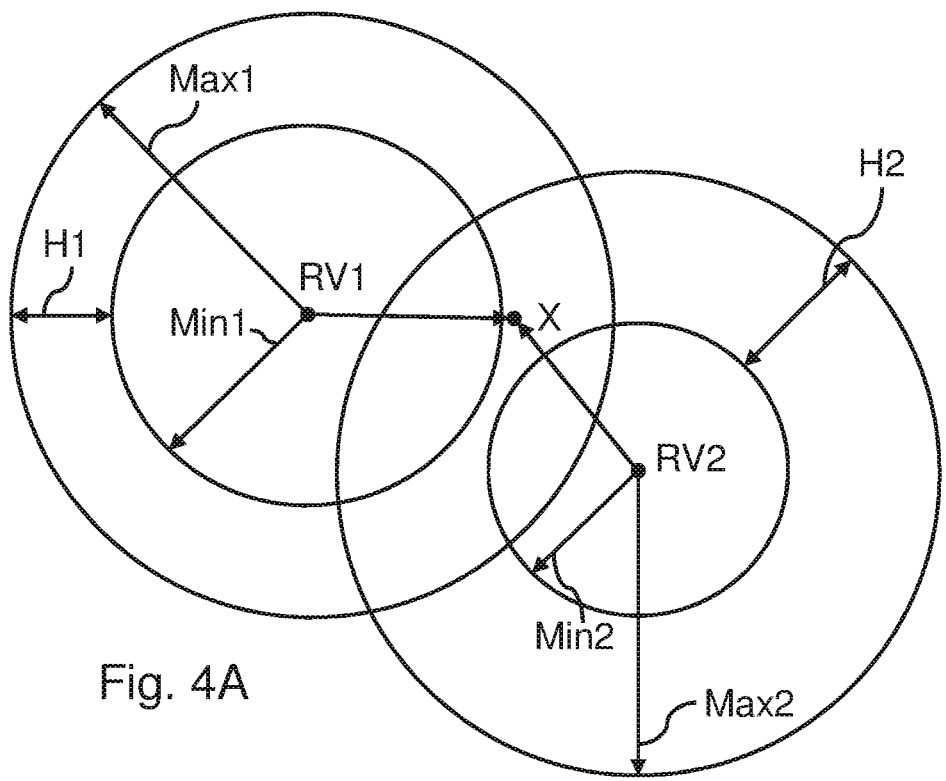
FIGS. 4A, 4B, 4C and 4D depict schematic diagrams illustrating the determination of a data extent based on attribute value information.

FIG. 4A to 4D depict schematic diagrams illustrating the determination of a query-specific subset of data extents. FIG. 4A shows a data-extent-specific reference point determined according to a method described above may comprise a first reference string value RV1 and a second reference string value RV2. For a given data extent, the radius Min1 defines the distance between the first string reference value RV1 and an attribute string value data of the data extent closest to RV1. The maximum distance Max1 defines the distance between the first string reference value RV1 and the attribute string value of the data extent being furthest away from RV2. Thus, all the attribute string values of the data extent are located somewhere within the circular band of range H1 delimited by the two circles with radius Min1 and Max1.

For the same data extent, the radius Min2 defines the smallest distance between the second string reference value RV2 and an attribute string value data of the data extent closest to RV2. The maximum distance Max2 defines the distance between the second string reference value RV2 and an attribute string value of the data extent being furthest away from RV2. Thus, all the attribute string value of the data extent in addition are located somewhere within the circular band of range H2 delimited by the two circles with radius Min2 and Max2. In other words, all the attribute string value of the data extent of the data extent in addition are located somewhere within the intersection of H1 and H2.

For example, a given search value X of a query may have a first distance to RV1 and a second distance to RV2 such that search value X is located within the intersection of H1 and H2. Thus, the data extent of FIG. 4A may be accepted and read into the RAM of a computer system such that a search for the search value may be performed thereon.

Figure 4B:
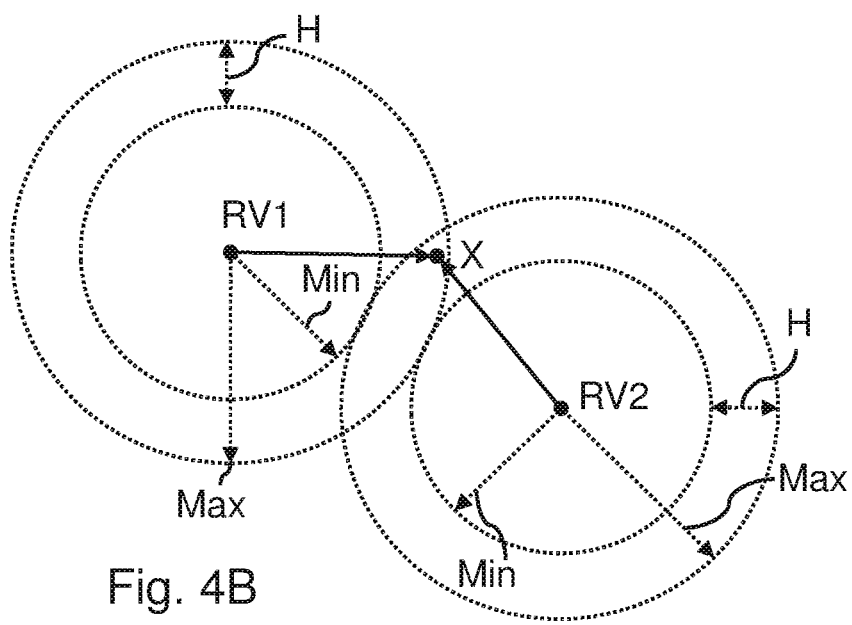

The efficiency of determining data extents of a query-specific set may be improved by considering attribute-string-value-specific minimum distances of the attribute values. For each attribute value only an attribute-string-value-specific minimum distance for any reference string value of the data-extent-specific reference point, i.e. for RV1 and RV2, may be taken into account. By taking into account only the attribute-string-value-specific minimum distances and selecting a minimum distance Min and a maximum distance Max of the respective attribute-string-value-specific minimum distances as attribute value information for the query processing as shown in FIG. 4B, a common range H for the data-extent-specific reference point, i.e. for all reference string values RV1 and RV2, may be defined. The common range H may be narrower than the ranges H1 and H2. Therefore, the area of attribute values potentially contained by the data extent which is provided by the intersection may be further narrowed down. A smaller intersection means that less search values may be determined to be potentially comprised by the data extent. Thus, with smaller intersections less data extents are selected to be read for processing a query thereon.

For the data extent of FIGS. 4A and 4B the reference-point-specific search distance of the data-extend-specific reference point comprising RV1 and RV2 lies within the limits provided by the minimum and maximum reference-point-specific minimum distances, i.e. Min and Max, stored as attribute value information for the respective data extent. The reference-point-specific search distance is the minimum distance between the search value X and any reference string value RV1 and RV2 of the respective data-extent-specific reference point. For example, the distance between the search value X and the reference string value RV1 is the minimum reference-point-specific search distance. Since the reference-point-specific search distance intersects with the intersection of the common range H assigned to RV1 and RV2, the respective data extent may be accepted and read into the RAM of a computer system such that the search for the search value in the data entries may be performed thereon.

Figure 4C:
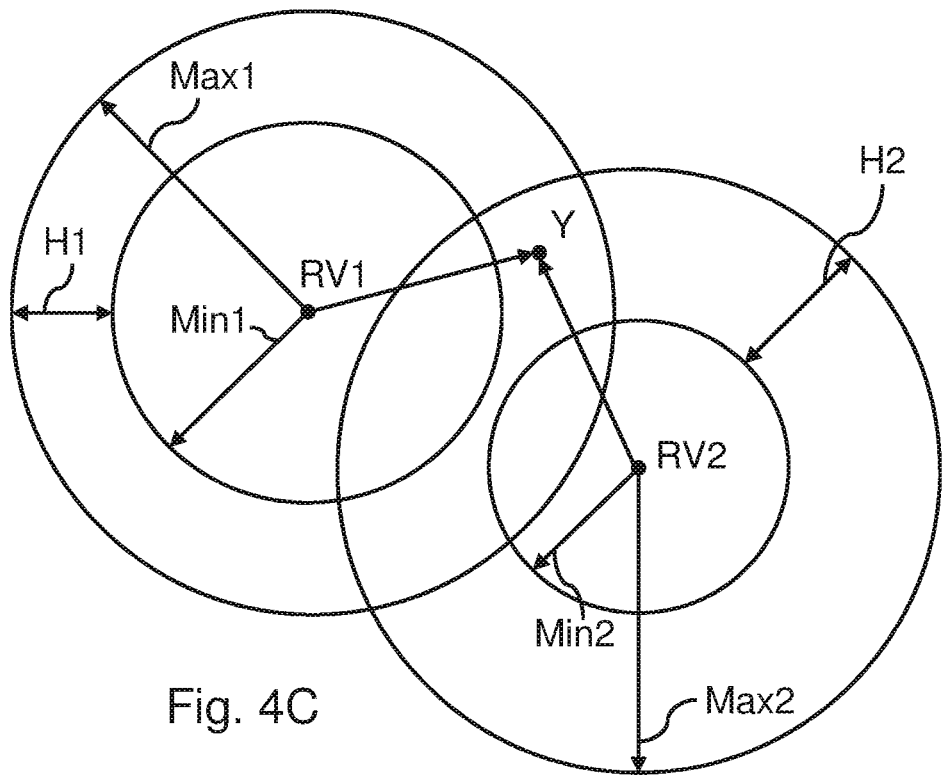
Figure 4D:
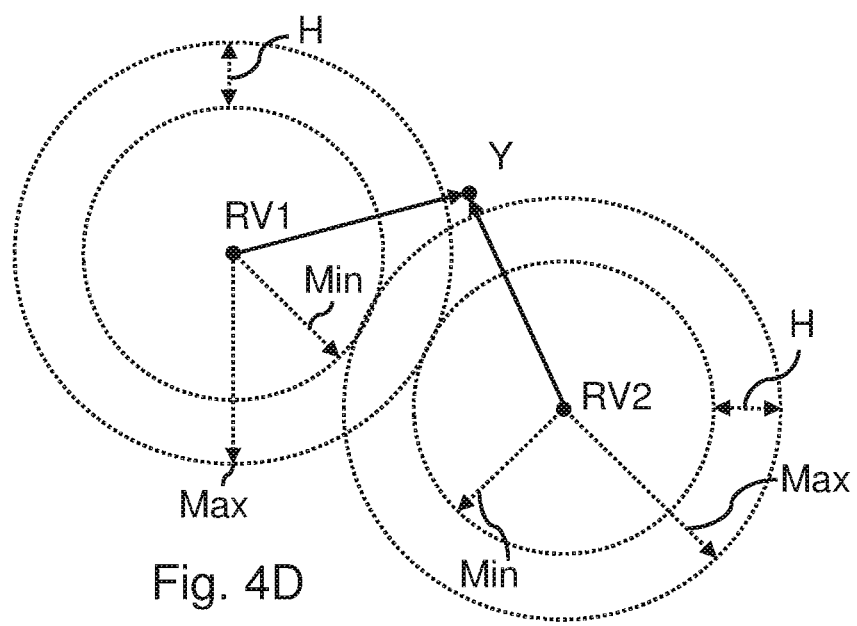

FIGS. 4C and 4D illustrate a further query for a search value Y having a first distance to RV1 and a second distance to RV2 such that search value Y is located within the intersection of H1 and H2, but not within the intersection of the common range H applied to RV1 and RV2. Thus, in case of the query according to FIGS. 4C and 4D, the data extent may not be accepted and read into the RAM of a computer system. Thus, no search for the search value is actually performed thereon. The reference-point-specific search distance for the search value Y may e.g. be the distance to RV1 being larger than Max.

Figure 5:
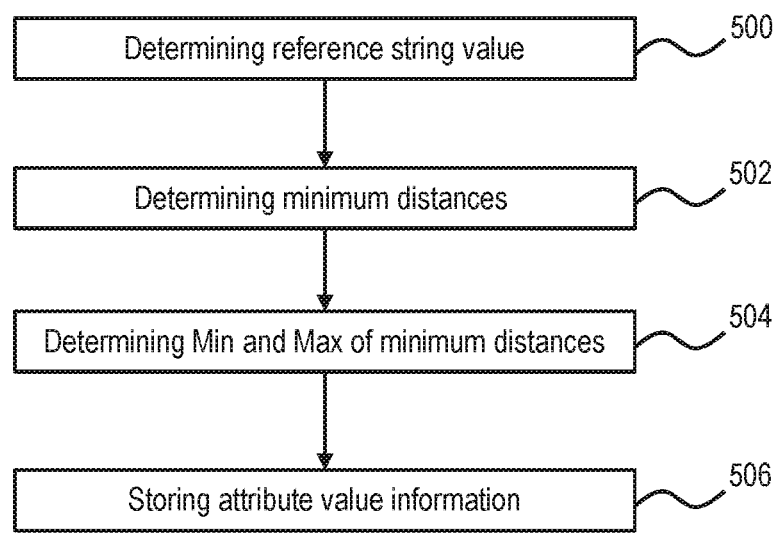
FIG. 5 depicts a schematic flow diagram of a first exemplary method for providing attribute value information for a data extent.

FIG. 5 depicts a schematic flow diagram of a first exemplary method for providing attribute value information for a data extent. In block 500, a reference string value of a data-extent-specific reference point is determined based on symbol frequencies at each sequence position of the attribute string values in a subset of the set of data entries of the data extent. The resulting reference string value comprises a sequence of symbols. In block 502, an attribute-string-value-specific minimum distance for any reference string value of the data-extent-specific reference point is determined for each of the attribute string values in the set of data entries. The determination results in a set of attribute-string-value-specific minimum distances for the set of data entries. In block 504, a minimum distance and a maximum distance of the set of attribute-string-value-specific minimum distances are determined. In block 506, the minimum distance and the maximum distance of the set of attribute-string-value-specific minimum distances are stored for the data extents as attribute value information for further use with query process.

Figure 6:
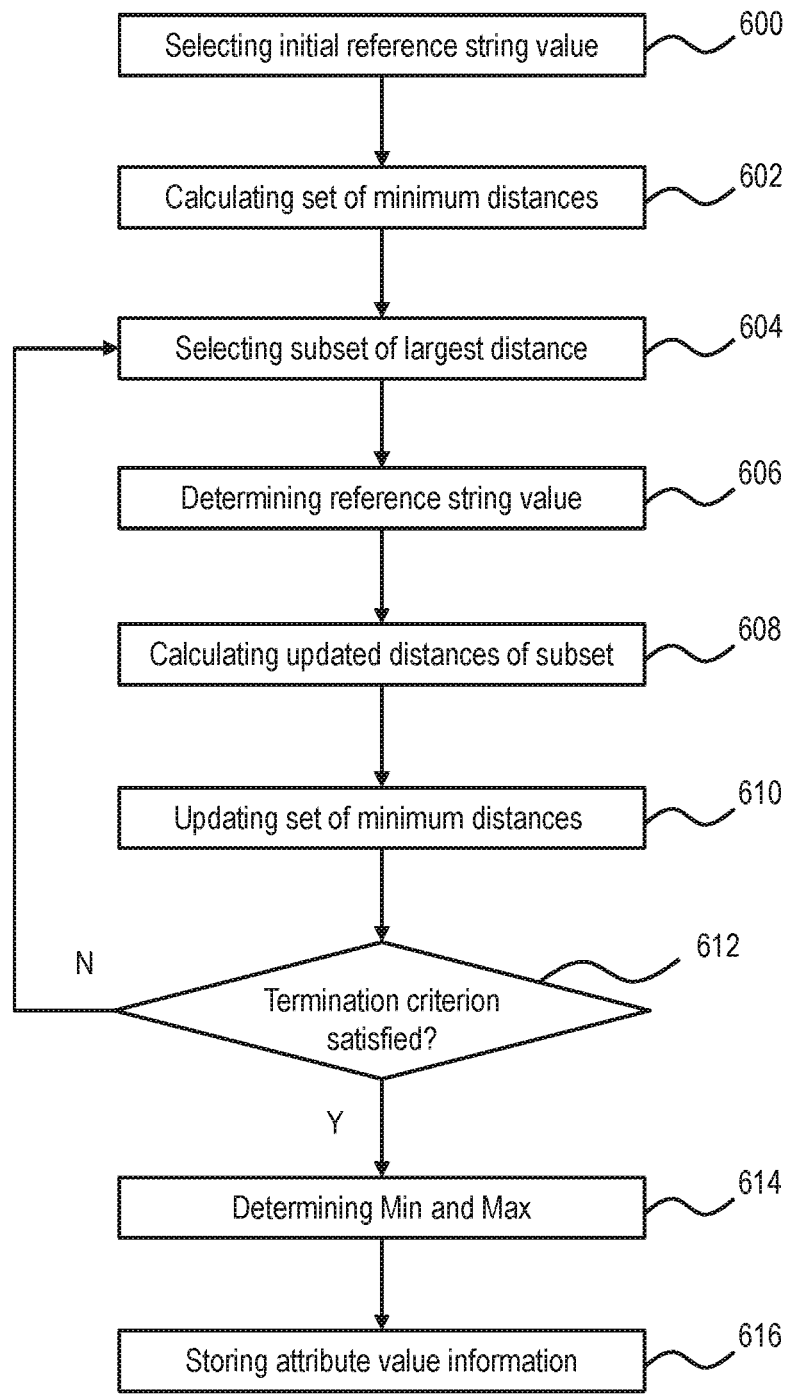
FIG. 6 depicts a schematic flow diagram of a second exemplary method for providing attribute value information for a data extent.

FIG. 6 depicts a schematic flow diagram of a second exemplary method for providing attribute value information for a data extent. In block 600, an initial reference string value of a data-extent-specific reference point is selected. In block 602, a set of attribute-string-value-specific minimum distances is calculated for the set of data entries of a data extent. The set of attribute-string-value-specific minimum distances comprises the distances between each of the attribute string values of the first attribute in the set of data entries and the initial reference string value of the data-extent-specific reference point.

In block 604, a largest distance comprised by the set of attribute-string-value-specific minimum distances is determined and a subset of attribute string values is selected. The subset comprises all attribute string values with an attribute-string-value-specific minimum distance equal to the determined largest distance. In block 606, a reference string value is determined. For this purpose, a most frequently used symbol is determined for each sequence position of the attribute string values. For each sequence position a respective most frequently used symbol is selected to be the symbol of the reference string value at the respective sequence position. In block 608, a distance between each of the attribute string values in the subset used for determining the latest reference string value and the respective latest reference string value are calculated. These distances may be used as updated distances. In block 610, for each attribute string value in the subset it is checked whether the respective calculated distance is smaller than the attribute-string-value-specific minimum distance for the respective attribute string value in the set of attribute-string-value-specific minimum distances. In case the calculated distance is indeed smaller, updating the respective attribute-string-value-specific minimum distance of the set of attribute-string-value-specific minimum distances with the calculated distance.

In block 612, it is checked whether a predefined termination criterion is satisfied. A termination criterion. May for example be that all attribute-string-value-specific minimum distances comprised by the updated set of attribute-string-value-specific minimum distances are equal to or smaller than a predefined threshold distance or that a maximum total number of reference string values of the data-extent-specific reference point is reached. In case the predefined termination criterion is not satisfied, the method continues with block 604.

In case the predefined termination criterion is satisfied, the method continues with block 614. In block 614, a minimum distance Min and a maximum distance Max of the set of attribute-string-value-specific minimum distances are determined. In block 616, this minimum distance and the maximum distance of the set of attribute-string-value-specific minimum distances are both stored for the data extent as attribute value information for further use with query processing. According to embodiments, the attribute value information may be stored as metadata in the data extent.

Figure 7:
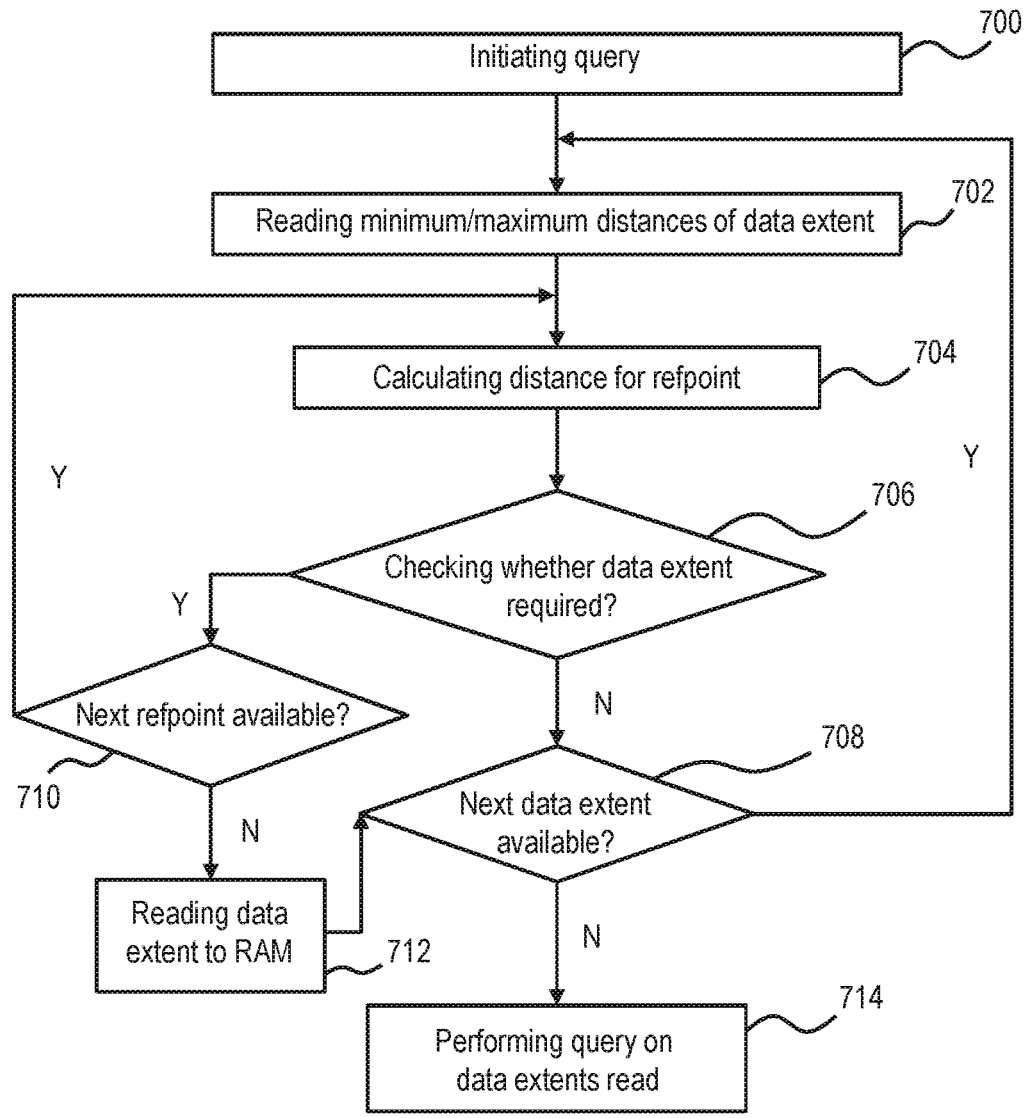
FIG. 7 depicts a schematic flow diagram of an exemplary query processing using the attribute value information of FIG. 5 and/or FIG. 6.

FIG. 7 depicts a schematic flow diagram of an exemplary query processing using the attribute value information of FIG. 5 and/or FIG. 6. In block 700, a query comprising a search value is initiated. In block 702, the attribute value information for a first data extent, i.e. a minimum distance Min and a maximum distance Max, for a first data-extent-specific reference point is read to a RAM of a computer system for processing the query. In case the attribute value information of the data extent comprises minimum and maximum distances for more than one reference point, all minimum and maximum distances may be read to the RAM. In block 704, the search distance of the search value for the data-extent-specific reference point is calculated, i.e. the minimum distance between the search value and any reference string value of the respective data-extent-specific reference point. Based on the maximum and minimum distance for the respective data-extent-specific reference point read in block 702 and the search distance calculated in block 704 it is checked in block 706, whether the data extent is required for the query. It is checked, whether there is a chance that the search value lies within the data range of the data extent defined by Min and Max. In case the data extent is required, the method proceeds with block 710. In block 710, it is checked, whether a further data-extent-specific reference point is available for which corresponding minimum and maximum distances have been assigned to the attribute value information of the data extent. In case, a further data-extent-specific reference point assigned to the data extent is available, the method continuous with calculating the search distance for the further data-extent-specific reference point according to block 704. In case, the minimum and maximum distances assigned to the respective further data-extent-specific reference point have not yet been read to the RAM in block 702, they may be read at this stage.

In case, no further data-extent-specific reference point is available, the data extent is read to the RAM of the computer system in block 712 and the method continuous in block 708 by checking for further available data extents. In case a further data extent is available, the method continuous with block 702 for the further data extent. In case no further data extent is available, the query is performed on the data extents read to the RAM which form a query-specific set of data extents. It is searched for the search value in the data entries of the data extents of the query-specific set.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the 'C' programming language or similar programming languages. The computer readable program instructions may execute entirely on the user computer system's computer, partly on the user computer system's computer, as a stand-alone software package, partly on the user computer system's computer and partly on a remote computer or entirely on the remote computer or server. In the latter scenario, the remote computer may be connected to the user computer system's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed:

1. A computer-implemented method for providing attribute value information for a data extent comprising a set of data entries, each data entry comprising an attribute string value of at least a first attribute, each attribute string value comprising a sequence of symbols, the method comprising:
   determining for the first attribute at least one reference string value of a data-extent-specific reference point based on symbol frequencies at each sequence position of the attribute string values of the first attribute in a subset of the set of data entries, the resulting reference string value comprising a sequence of symbols;
   determining for each of the attribute string values of the first attribute in the set of data entries an attribute-string-value-specific minimum distance for any reference string value of the data-extent-specific reference point resulting in a set of attribute-string-value-specific minimum distances for the set of data entries;
   storing for the data extent the minimum distance and the maximum distance of the set of attribute-string-value-specific minimum distances as attribute value information for further use with query processing.

2. The method of claim 1, the determining of the reference string value comprising:
   determining for each sequence position of the respective attribute string values a most frequently used symbol which is selected to be the symbol of the reference string value at the respective sequence position.

3. The method of claim 1, the subset being equal to the set of data entries and the set of attribute-string-value-specific minimum distances for the set of data entries being equal to the set of distances.

4. The method of claim 1, further comprising:
   using an initial reference string value of the data-extent-specific reference point for the determining of the reference string value, the initial reference string value comprising a sequence of symbols, wherein for determining the reference string value the method further comprises:
   calculating a distance between each of the attribute string values of the first attribute in the set of data entries and the initial reference string value of the data-extent-specific reference point resulting in the set of attribute-string-value-specific minimum distances for the set of data entries;
   determining the largest distance comprised by the set of attribute-string-value-specific minimum distances;
   selecting for the subset all attribute string values with an attribute-string-value-specific minimum distance equal to the determined largest distance;
   determining the reference string value using the attribute string values of the subset by determining for each sequence position of the attribute string values of the subset a most frequently used symbol which is selected to be the symbol of the reference string value at the respective sequence position.

5. The method of claim 4, the initial reference string value comprising a sequence of symbols selected based on symbol frequencies at each sequence position of the attribute string values of the first attribute in the set of data entries.

6. The method of claim 1, the method further comprising repeatedly determining in a sequential order additional reference string values of the data-extent-specific reference point based on symbol frequencies at each sequence position of the attribute string values for the first attribute until a predefined termination criterion is satisfied, the determining of each of the additional reference string values comprising:
   calculating a distance between each of the attribute string values in the subset used for determining the latest reference string value according to the sequential order and the respective latest reference string value;
   checking for each attribute string value in the subset whether the respective calculated distance is smaller than the attribute-string-value-specific minimum distance for the respective attribute string value in the set of attribute-string-value-specific minimum distances, in case the calculated distance is smaller, updating the respective attribute-string-value-specific minimum distance of the set of attribute-string-value-specific minimum distances with the calculated distance;
   determining an updated largest distance comprised by the updated set of attribute-string-value-specific minimum distances;
   selecting for an additional subset all attribute string values with an attribute-string-value-specific minimum distance equal to the determined updated largest distance;
   determining the additional reference string value using the attribute string values of the additional subset by determining for each sequence position of the attribute string values of the additional subset a most frequently used symbol which is selected to be the symbol of the respective additional reference string value at the respective sequence position.

7. The method of claim 6, the criterion being that all attribute-string-value-specific minimum distances comprised by the updated set of attribute-string-value-specific minimum distances are equal to or smaller than a predefined threshold distance.

8. The method of claim 6, the criterion being that a maximum total number of reference string values of the data-extent-specific reference point is reached.

9. The method of claim 1, for calculating distances between the attribute string values and the reference string value of the data-extent-specific reference point the method further comprising:
   replacing in the attribute string values infrequently used symbols of a set of symbols from which the symbols of the attribute string values are selected by more frequently used symbols of the set of symbols.

10. The method of claim 1, for calculating distances between the attribute string values and the reference string value of the data-extent-specific reference point the method further comprising:
    in case the number of symbols of one of the attribute string values is smaller than a predefined number of symbols adding to the respective attribute string value one or more symbols which are no elements of a set of symbols from which the symbols of the attribute string values are selected such that the predefined number of symbols is reached.

11. The method of claim 1, the calculated distances being minimum edit distances.

12. The method of claim 1, the minimum edit distance being calculated using one of the following metrics: Hamming-Metric, Levenshtein-Metric, Damerau-Levenshtein-Metric.

13. The method of claim 1, in case a new attribute string value of the first attribute is added to the data extent, the method further comprising maintaining the data-extent-specific reference point at data extent level by:

calculating a distance between the new attribute string value and each reference string value of the data-extent-specific reference point;

determining the minimum distance of the distances calculated for the new attribute string;

checking whether the minimum distance of the new attribute string value satisfies one of the following two criteria: being larger than the maximum distance or being smaller than the minimum distance of the attribute value information of the data extent;

in case the minimum distance of the new attribute string value satisfies one of the two criteria, determining the reference string values of the data-extent-specific reference point.

14. The method of claim 1, in case a new attribute string value of the first attribute is added to the data extent, the method further comprising maintaining the attribute value information for the data extent by calculating a distance between the new attribute string value and each reference string value of the data-extent-specific reference point;

determining the minimum distance of the distances calculated for the new attribute string;

checking whether the minimum distance of the new attribute string value is larger than the maximum distance of the attribute value information of the data extent, in case the minimum distance of the new attribute string value is larger replacing the maximum distance by the respective lager distance;

checking whether the minimum distance of the new attribute string value is smaller than the minimum distance of the attribute value information of the data extent, in case the minimum distance of the new attribute string value is smaller replacing the minimum distance by the respective smaller distance.

15. The method of claim 1, in case an attribute string value of the first attribute is deleted from the data extent, the data-extent-specific reference point being retained unaltered.

16. The method of claim 1, in case an attribute string value of the first attribute is deleted from the data extent, the method further comprising maintaining the attribute value information for the data extent by:

calculating the distance between each of the remaining attribute string values of the first attribute in the set of data entries and each of the reference string values of the data-extent-specific reference point;

determining for each of the remaining attribute string values the minimum distance of the calculated distances resulting in a reduced set of attribute-string-value-specific minimum distances;

determining the minimum distance and the maximum distance of the reduced set of attribute-string-value-specific minimum distances;

checking whether the determined maximum distance is smaller than the maximum distance of the attribute value information of the respective data extent, in case the determined maximum distance is smaller replacing the maximum distance of the attribute value information by the determined maximum distance;

checking whether the determined minimum distance is larger than the minimum distance of the attribute value information of the respective data extent, in case the determined minimum distance is larger replacing the minimum distance of the attribute value information by the determined minimum distance.

17. The method of claim 1 being performed for a plurality of the data extents resulting in a data-extend-specific reference point for each of the respective data extents.

18. The method of claim 17, the method further comprising processing a query, the query comprising a search value, processing the query comprising:

determining a reference-point-specific search distance between the search value and each data-extend-specific reference point resulting in a set of reference-point-specific search distances, each reference-point-specific search distance being the minimum distance between the search value and any reference string value of the respective data-extent-specific reference point;

determining a query-specific set of data extents of the plurality of data extents, the query-specific set of data extents comprising all data extents for which the reference-point-specific search distance of a data-extend-specific reference point of the respective data extend lies within the limits provided by the minimum reference-point-specific distance and the maximum reference-point-specific distance of the respective data-extend-specific reference point stored as attribute value information for the respective data extent;

searching for the search value in the data entries of the data extents of the query-specific set.

* * * * *